United States Patent [19]
Nichols

[11] 3,724,165
[45] Apr. 3, 1973

[54] APPARATUS FOR INSERTING TABLETS INTO BLISTER PACKAGES

[75] Inventor: Matthew Nichols, Norristown, Pa.

[73] Assignee: Sauter Packaging Company, Souderton, Pa.

[22] Filed: May 10, 1971

[21] Appl. No.: 141,762

[52] U.S. Cl. ................................................53/250
[51] Int. Cl. ...........................................B65b 5/00
[58] Field of Search........53/250, 253, 246, 247, 254, 53/78; 221/3 R, 8, 201, 202, 265

[56] References Cited

UNITED STATES PATENTS

| | | | |
|---|---|---|---|
| 3,490,197 | 1/1970 | Cremieux | 53/78 X |
| 2,846,830 | 8/1958 | Bossi | 53/246 X |
| 2,732,987 | 1/1956 | Moore | 53/78 UX |
| 3,389,531 | 6/1968 | Ehe et al | 53/246 X |
| 3,354,607 | 11/1967 | Lakso | 53/78 |
| 2,949,997 | 8/1960 | Martell | 221/265 X |
| 3,628,694 | 12/1971 | Nichols | 53/246 X |
| 2,943,428 | 7/1960 | Stroop | 53/78 UX |

Primary Examiner—Travis S. McGehee
Assistant Examiner—Horace M. Culver
Attorney—Louis Necho

[57] ABSTRACT

An apparatus for filling tablets into blister packages, including a lower assembly which provides a vibrating guide for directing elongate thermoplastic strips longitudinally through the apparatus. A movable carriage reciprocates above the lower assembly and carries a plurality of brushes in rotary contact with the top surface of the thermoplastic strips of material. A portion of said brushes are transversely disposed with respect to the elongate thermoplastic strips and are rotatively journalled within the carriage assembly. Other of said brushes circularly rotate with respect to the elongate strips and combine with the transverse brushes to thoroughly sweep the entire top surface of the strips to urge medicinal tablets and the like into depending blisters which are formed in the thermoplastic strips.

6 Claims, 6 Drawing Figures

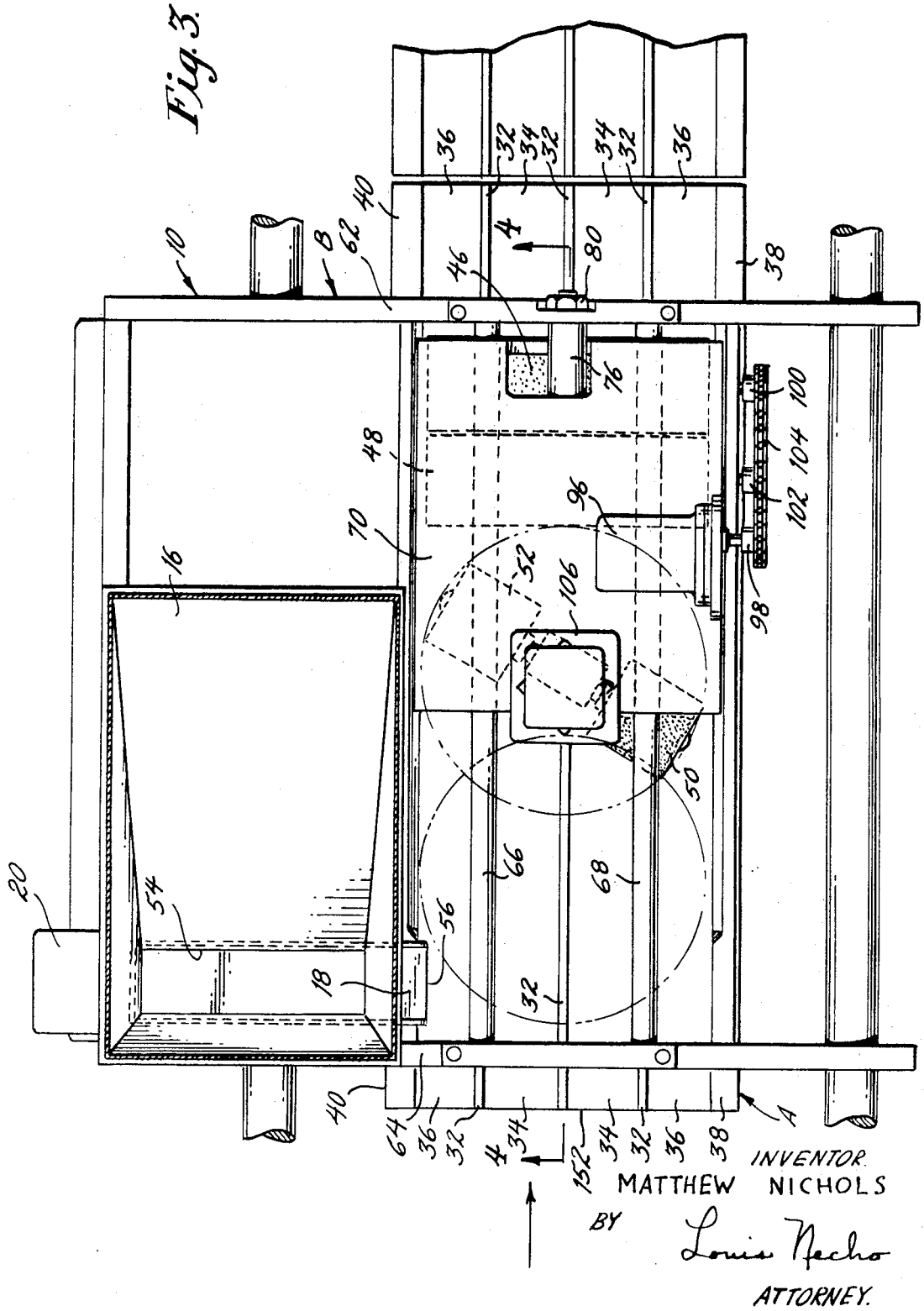

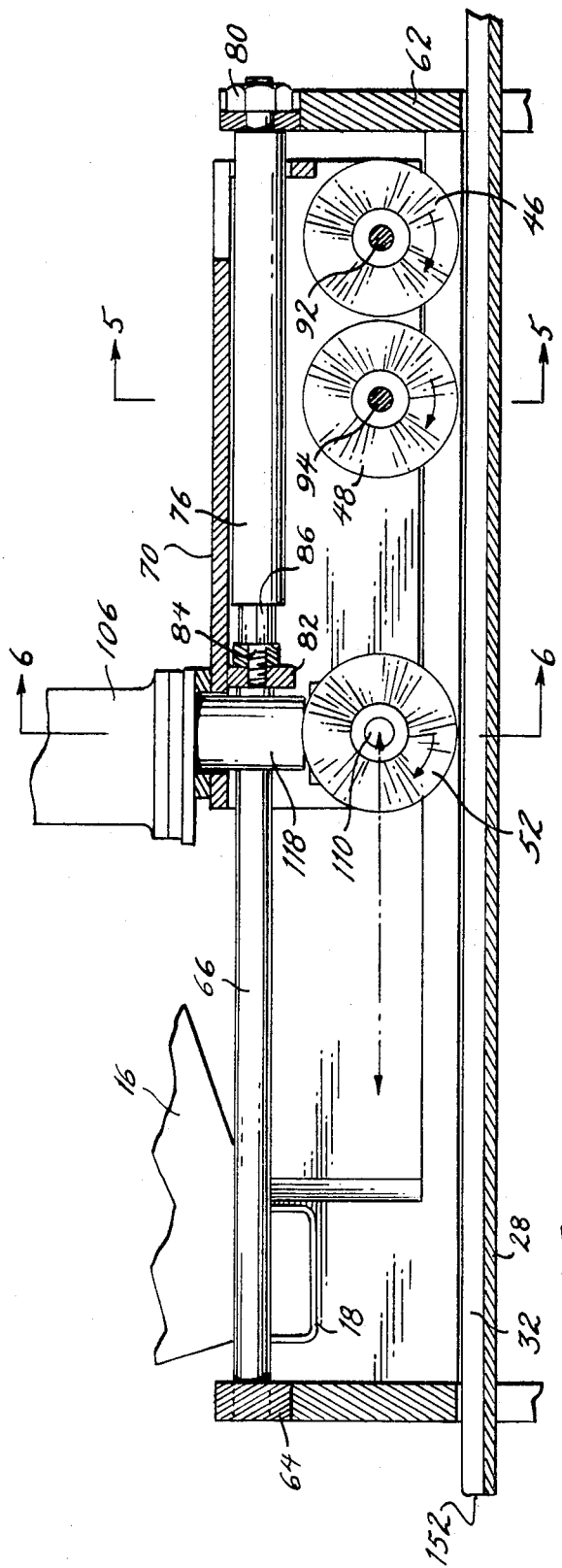
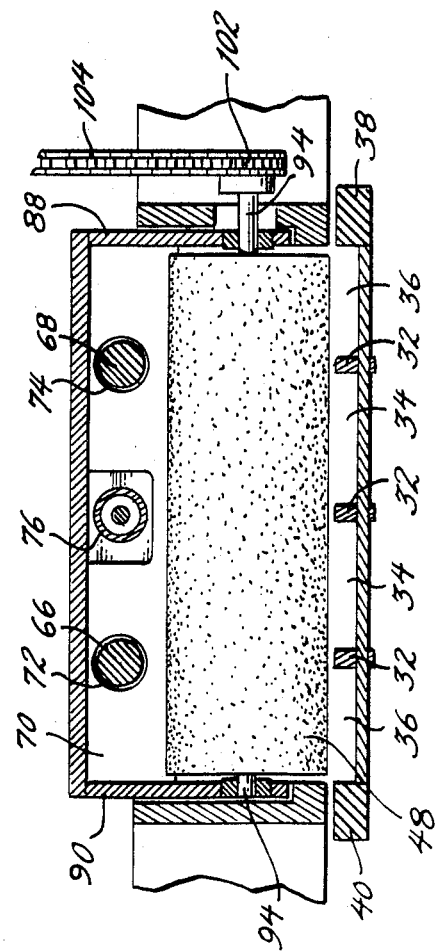

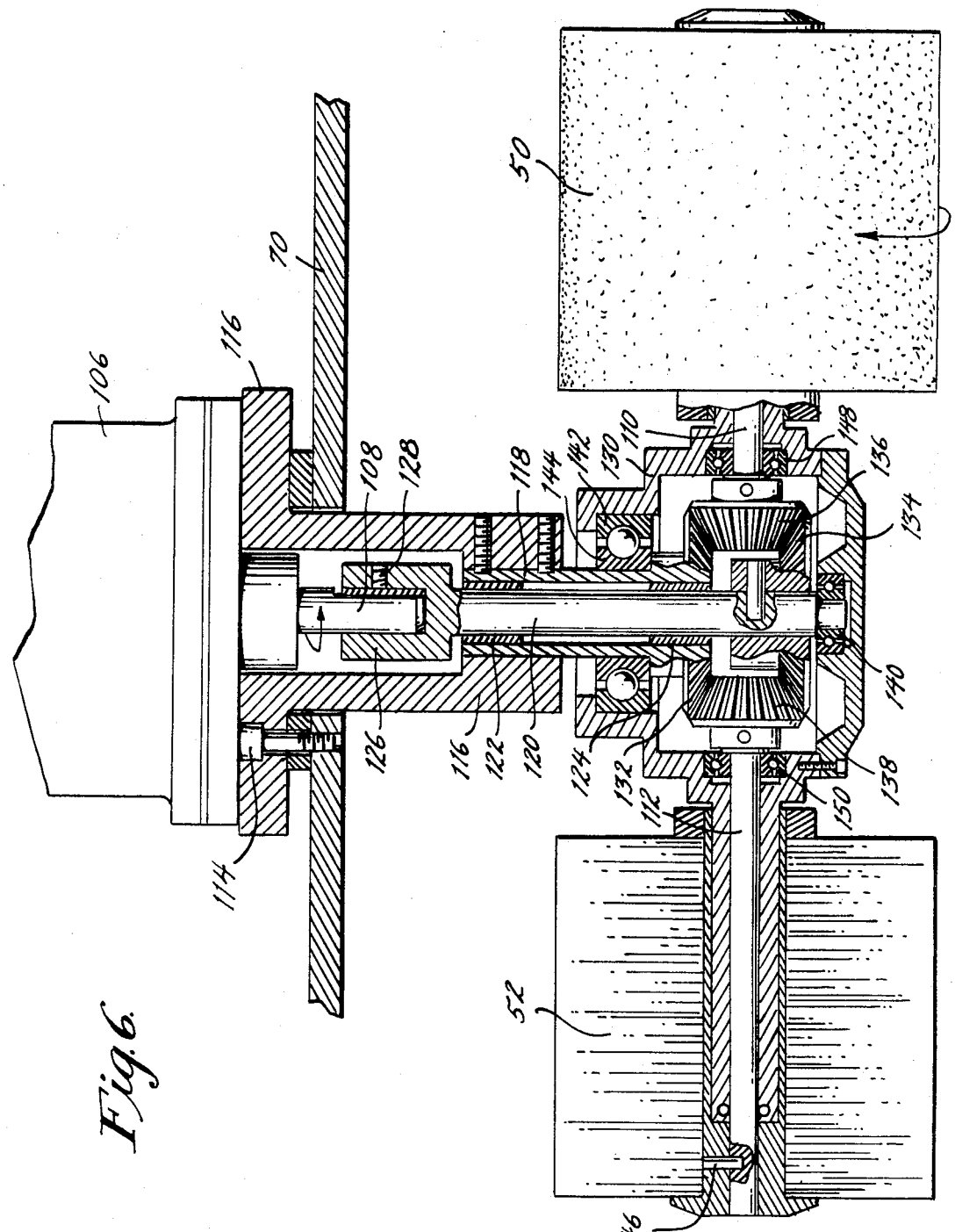

APPARATUS FOR INSERTING TABLETS INTO BLISTER PACKAGES

BACKGROUND OF THE INVENTION

The present invention relates to the general field of medicinal tablet packaging, and more particularly, is directed to an apparatus for rapidly filling tablets individually into pre-formed blisters in a thermoplastic strip as the strip moves longitudinally through the apparatus.

In the interest of sanitation, speed, accuracy in dispensing, and in inventory control, it has become increasingly the practice in institutions such as hospitals and nursing homes to require medicinal tablets to be packaged sealed in spaced blisters which are formed in a continuous strip of thermoplastic material. The thermoplastic material strip may be perforated transversely between blisters to facilitate separation into any desired number of tablet dosages by the users. By this arrangement, if a patient is to get, say two tablets of a given medication at a time, the hospital or nursing home dispensary pharmacist simply can sever the desired number of tablet-containing blisters from the elongate strip and then deliver them to the nurse on duty. This procedure insures against unsanitary handling of the tablets and enables the dispensary to control the inventory in a precise manner. By packaging the tablets in transparent thermoplastic strips, the tablets may be viewed directly through the blisters to permit visual inspection of the tablets to insure against possibly dispensing the wrong medication.

If all of the tablets dispensed in the hospitals and nursing homes were of the same size and shape, presently available equipment could be employed to adequately fill the blisters without problem. But it is the usual practice to formulate medication in tablet or capsule form of many different sizes and shapes, and this has heretofore made it necessary to change the size of the blister according to the size of the tablet to be sealed within the blister and to alter the filling machinery each time the tablet size was changed. Changing the die and other parts which co-operate in forming and filling the blisters involves large expenditures, both in material costs and in the labor costs necessary to adapt the equipment for another size tablet. Because of the set-up time required, the cost of utilizing the prior art devices has been disproportionate to the results obtained.

SUMMARY OF THE INVENTION

The present invention relates generally to an apparatus for individually packaging medicinal tablets of various sizes without requiring individual setup, and more particularly, includes brush means to uniformly sweep the medicinal tablets into pre-formed blisters in an elongate thermoplastic strip.

The instant device includes a lower assembly which is provided with vibrating means and which serves as a guide for thermoplastic strips as they longitudinally feed through the apparatus. The elongate strips are pre-formed in accordance with known procedures to provide a plurality of depending blisters for receipt of medicinal tablets which are to be individually packaged therein. The lower assembly includes vibrating means to facilitate individually loading tablets into each pre-formed, depending blister in a rapid, accurate manner.

A carriage assembly reciprocates above the lower assembly and carries a plurality of rotary brushes which journal within the carriage assembly for rotary, peripheral contact with the surface of the thermoplastic strips. The brushes co-operate to sweep medicinal tablets across the surface of the thermoplastic strips and are arranged to sweep tablets completely across the entire surface of the elongate strips. In this manner, when a tablet registers with a depending blister, the tablet falls into the blister to thereby fill the same for packaging purposes. Once a blister has been filled with a medicinal tablet, the brushes serve to sweep other tablets away from the filled blister thereby to assure that only one tablet is filled into each blister.

Some of said carriage assembly brushes transversely position with respect to the longitudinal axis of the thermoplastic strip and journal within the carriage assembly structure for transverse rotation above the thermoplastic strip. Other of said brushes journal within the carriage assembly and are arranged for circular rotation above the thermoplastic strip. The transverse brushes and the circular brushes co-operate to provide complete sweeping action above the top surface of the thermoplastic strip so that medicinal tablets are evenly and uniformly distributed over the surface to assure that each depending blister is properly filled as the thermoplastic strip is longitudinally fed through the apparatus. The carriage assembly is reciprocal with respect to the lower assembly. The reciprocating motion of the carriage combines with the rotary and circular motions of the brushes to insure positive tablet-filling into all of the depending blisters without requiring any manual operations, and with a minimum of set-up procedure.

It is therefore an object of the present invention to provide improved apparatus for filling tablets into blister packages of the type set forth.

It is another object of the present invention to provide a novel apparatus for filling tablets into blister packages which incorporates a vibrating lower assembly which supports an elongate web of blister pre-formed thermoplastic material and includes guide means for directing the elongate web through the apparatus.

It is another object of the present invention to provide an improved apparatus for filling tablets into blister packages which includes a vibrating lower assembly for guiding elongate, blister-containing thermoplastic strips and a cooperating upper assembly which includes a carriage having reciprocal motion with respect to the lower assembly.

It is another object of the present invention to provide a novel apparatus for filling tablets into blister packages including lower assembly means for guiding an elongate strip of thermoplastic material having pre-formed blisters depending therefrom longitudinally through the apparatus, and an upper carriage reciprocal above the elongate strip, said upper carriage including brush means to sweep medicinal tablets along the surface of the said elongate strip.

It is another object of the present invention to provide a novel apparatus for filling tablets into preformed blister packages which includes means to support an elongate blister-containing web and carriage means reciprocal above the web, said carriage means rotatively carrying brushes to sweep the top surface of the web, some of said brushes arranged transversely to the axis of the web and other of said brushes having circular motion with respect to the axis of the web.

It is another object of the present invention to provide a novel apparatus for filling tablets into blister packages that is rugged in construction, entirely automatic in use and trouble-free in operation.

Other objects and a fuller understanding of the invention will be had by referring to the following description and claims of a preferred embodiment thereof, taken into conjunction with the accompanying drawings, wherein like reference characters refer to similar parts throughout the several views, and in which:

BRIEF DESCRIPTION OF THE DRAWINGS

FIG. 3 is a cross sectional view taken along line 3 — 3 of FIG. 1, looking in the direction of the arrows.

FIG. 4 is an enlarged, cross sectional view taken along line 4 — 4 of FIG. 3, looking in the direction of the arrows.

FIG. 5 is a cross sectional view taken along line 5 — 5 of FIG. 4, looking in the direction of the arrows.

FIG. 6 is an enlarged cross sectional view taken along line 6 — 6 of FIG. 4, looking in the direction of the arrows.

DESCRIPTION OF THE PREFERRED EMBODIMENT OF THE INVENTION

Figure 1:
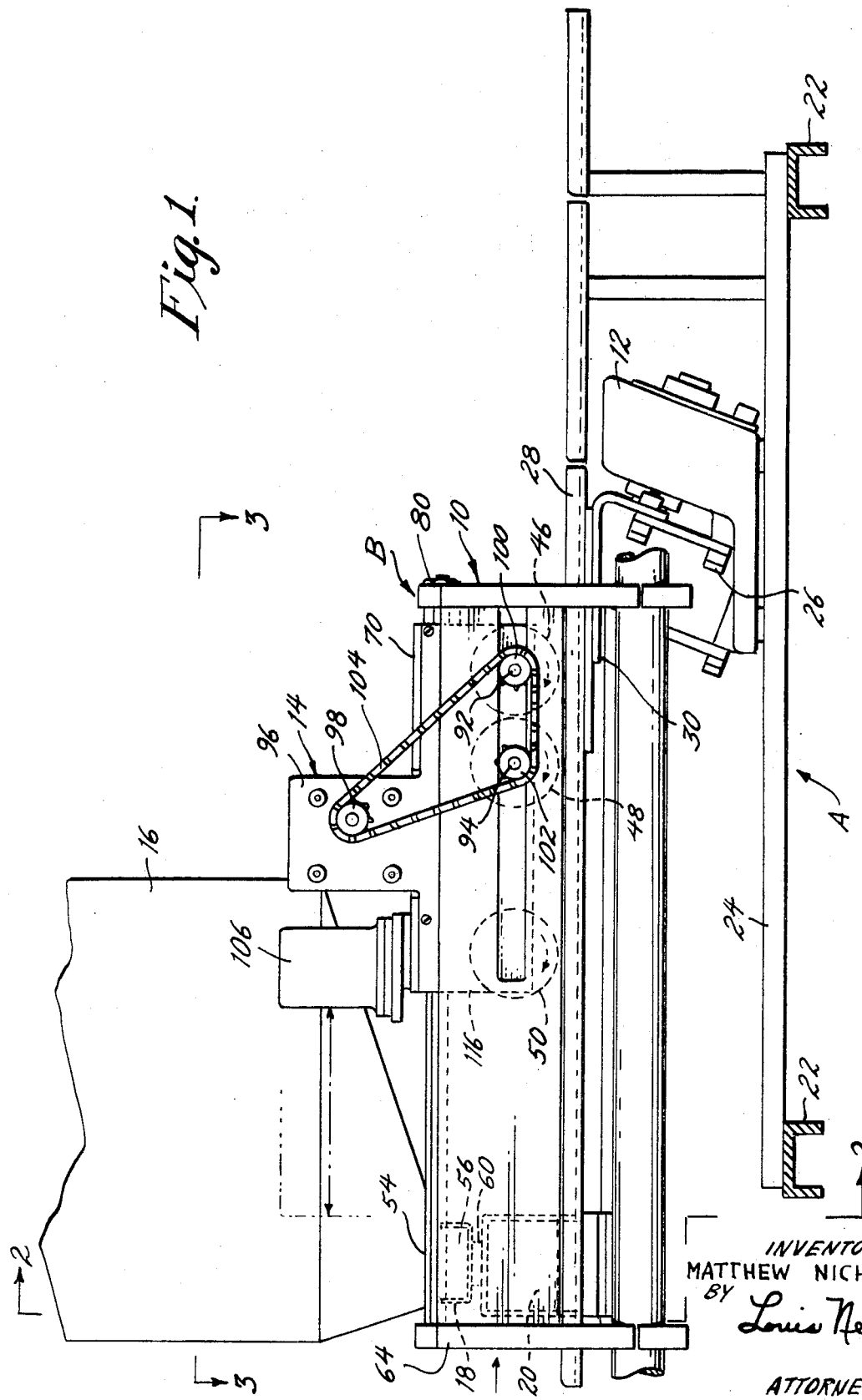
FIG. 1 is a side elevational view of the apparatus for filling tablets into blister packages in accordance with the present invention.

Although specific terms are used in the following description for the sake of clarity, these term are intended to refer only to the particular structure of my invention selected for illustration in the drawings and are not intended to define or limit the scope of the invention.

Referring now to the drawings, the apparatus for filling tablets into blister packages is generally designated 10 and includes a lower assembly A which is generally stationary except for the effect of the lower vibrator 12. An upper assembly B positions above the lower assembly A and is generally stationary except for the carriage portion 14 thereof which has reciprocal motion with respect to the lower assembly A and moves up and down stream while the brushes are in operation. The upper assembly B also includes a tablet-feeding hopper 16 which deposits a plurality of tablets (not shown), upon a transverse feed chute 18 which vibrates through action of the upper vibrator 20 to introduce the tablets to the lower assembly A.

Figure 2:
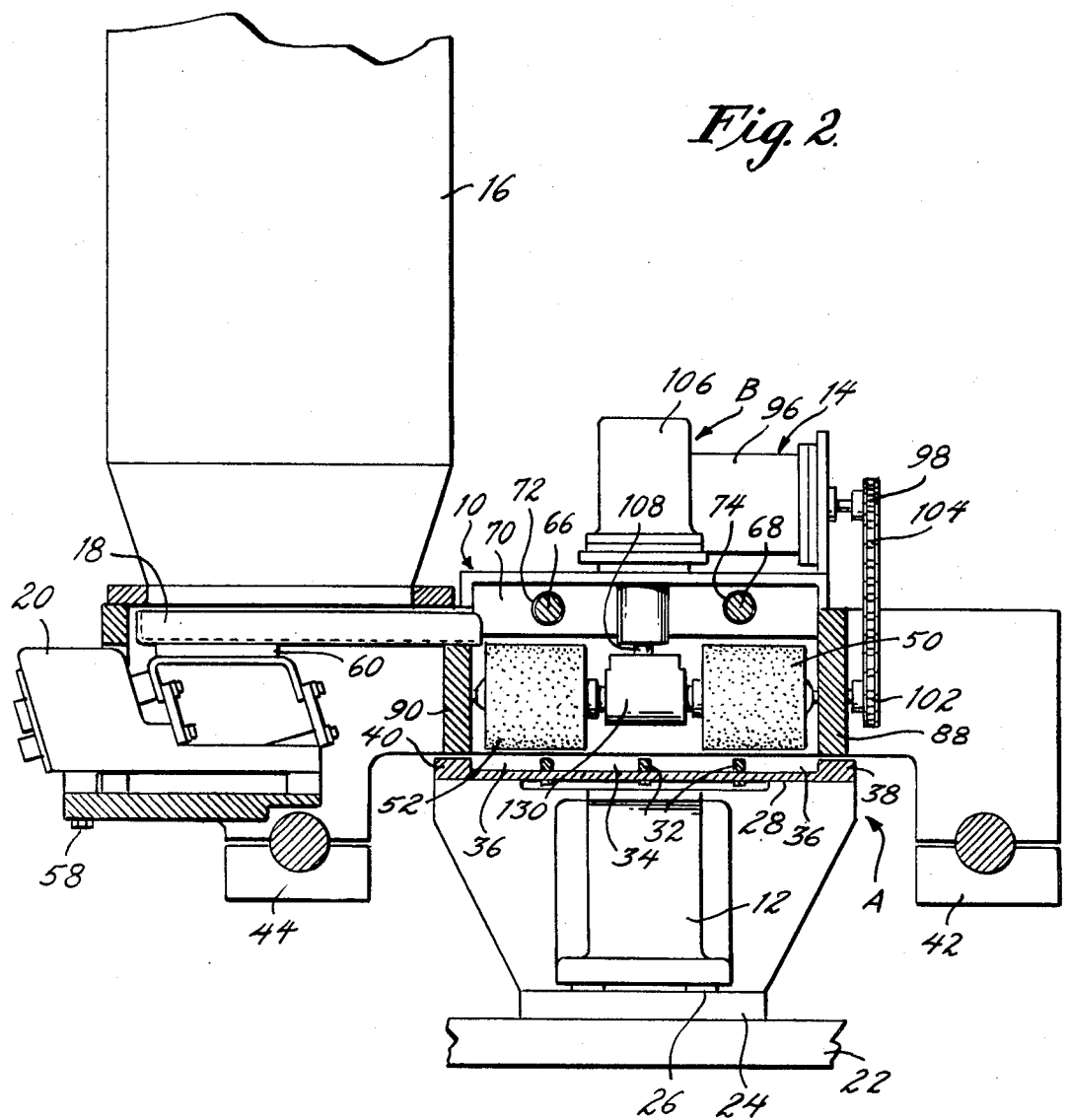
FIG. 2 is a cross sectional view taken along line 2 — 2 of FIG. 1, looking in the direction of the arrows.

The lower assembly A incorporates a stationary base 22 which is supported upon a solid surface such as a building floor (not shown) to form a sturdy support for the tablet filling apparatus 10. A platform 24 secures to the base 22 and carries the lower vibrator 12 in conventional manner. The lower vibrator 12 affixes to the platform 24 through the use of bolts 26 or other suitable fastening construction suitable for the purpose. A longitudinal guide 28 is horizontally carried above the stationary base 22 and has its underside affixed to the vibrator arm 30 of the lower vibrator 12 in well-known manner such as by welding. Energization of the lower vibrator 12 vibrates the arm 30 and the affixed longitudinal guide 28 in a manner to facilitate tablet filling as hereinafter more fully set forth. As best seen in FIG. 2, the longitudinal guide 28 includes a plurality of spaced, longitudinally disposed strips 32, which define longitudinal troughs 34 therebetween. Similarly, the longitudinal troughs 36 which are equal in dimension to the troughs 34 are defined between each transverse guide edge 38, 40, and its adjacent strip 32. It is contemplated that elongate, thermoplastic strips (not shown) having depending blisters (not shown) pre-formed therein, will be longitudinally urged through the apparatus 10 by equipment external to the present apparatus. The thermoplastic strips may be similar to thermoplastic strips fully described in my copending application titled "Apparatus for Packaging Medicinal Tablets or the Like," Ser. No. 26,616, filed Apr. 8, 1970, now U.S. Pat. No. 3,628,694. The guide strips 32 will position between adjacent transverse rows of blisters and the depending blisters themselves will position in the adjacent troughs 34, 36, to positively guide the elongate thermoplastic strips through the apparatus. A single wide strip or a plurality of narrow strips could be accommodated in this manner. Vibration of the longitudinal guide 28 under urging of the lower vibrator 12 will also serve to vibrate the thermoplastic strips (not shown) as they feed through the apparatus 10 upon the longitudinal guide 28.

The upper assembly B has the carriage portion 14 thereof registered above the lower assembly A for pill sweeping purposes as hereinafter more fully set forth. The upper assembly B is stationary upon its respective transverse supports 42, 44, with the exception of the carriage portion 14 which reciprocates up and downstream with respect to the longitudinal guide 28 when the carriage brushes 46, 48, 50, 52, are in operation.

A tablet feeding hopper 16 of conventional design secures to fixed portions of the upper assembly B and feeds medicinal tablets (not shown) by gravity upon the transverse feed chute 18. The feed chute 18 is in the form of the open trough of generally U-shaped configuration which registers beneath the hopper opening 54 to receive the medicinal tablets by action of the forces of gravity. The chute 18 transversely positions beside the longitudinal guide 28 and has its inward terminus 56 overlying a portion of the guide inwardly from the guide edge 40 so that medicinal tablets from the hopper 16 may be introduced upon the top surface of the guide 28. Thus, when a thermoplastic strip (not shown) is urged through the longitudinal guide 28, the tablets (also not shown) will fall upon the surface of thermoplastic strip itself so that the tablets may then be swept into the depending blisters (not shown) by the cooperating action of the brushes 46, 48, 50, and 52, as they sweep across the top surface of the thermoplastic strip. An upper vibrator 20 bolts or otherwise secures to a portion of the transverse support 44 by means of the upper vibrator bolts 58 and has its vibrator arm 60 affixed to the feed chute 18 in secure manner such as by welding. Accordingly, upon operation of the upper vibrator 20, the feed chute 18 is caused to vibrate to shake or oscillate sufficiently to cause the medicinal tablets to flow toward the terminus 56 of the chute 18 to fall, thereby, by gravity upon the top of the thermoplastic strips (not shown), as they travel across the longitudinal guide 28.

The upper assembly B includes a forward vertical support 62 and a rearward vertical support 64 which carry the carriage portion 14, the hopper 16, and feed chute 18, therebetween. A pair of longitudinally disposed, horizontally spaced guide rods 66, 68, secure between the forward and rearward supports 62, 64, to facilitate carriage portion travel in reciprocal manner between the supports. As best seen in FIGS. 2 and 3, the carriage potion 14 includes a cross head 70 which is provided with longitudinal, spaced, cylindrical openings 72, 74, to receive the guide rods 66, 68, therein in sliding engagement to facilitate carriage reciprocation above the longitudinal guide 28. An activating cylinder 76, which may be of the hydraulic or pneumatic type, has its stationary end 78 affixed to the forward support 62 by means of a bolted connection 80. The piston rod secures to the bracket 82 in a threaded connection 84 and functions to reciprocate the cross head 70 along the guide rods 66, 68, in response to activation of the cylinder 76. Thus, energization of the cylinder 76 activates the piston rod 86 to push to crosshead 70 rearwardly with respect to the forward support 62. De-energization of the cylinder 76 allows the piston rod 86 to return to its initial position, thereby pulling the crosshead 70 forwardly along the guide rails 66, 68.

As best seen in FIG. 5, the crosshead 70 terminates laterially in a pair of depending, spaced side carriers 88, 90, which register above the respective longitudinal guide edges 38, 40, and expose the entire surface area of the longitudinal troughs 34, 36, therebetween. A pair of transverse, rotary brushes 46, 48, turn about their respective shafts 92, 94, in vertical spaced relationship above the longitudinal guide 28 in precise vertical alignment so that the peripheral edges of the brushes 46, 48, sweep the top surface of the longitudinal guide 28. It will be appreciated that when a thermoplastic strip (not shown), having depending blisters formed therein is urged through the apparatus 10 upon the longitudinal guide 28, the brushes 46, 48, will contact the top surface of the thermoplastic strip for medicinal tablet sweeping purposes. The brush shafts 92, 94, journal within the side carriers 88, 90, and serve to rotate the brushes 46, 48, as the carriage portion 14 reciprocates upon the guide rails 66, 68, in response to function of the cylinder 76. A motor 96 mounts upon the top of the cross head 70 and powers a driving sprocket 98 in conventional manner. Each of the brush shafts 92, 94, terminates outwardly from the side carrier 88 in a driven sprocket 100, 102, for brush rotative purposes. An endless chain interconnects the driving and driven sprockets 98, 100, 102, in conventional manner to rotate the brushes 46, 48, in response to operation of the electrical motor 96. See FIG. 1.

A second electrical motor 106 mounts upon the crosshead 70 rearwardly of the motor 96 and has its power shaft 108 depending vertically through the cross head 70 for circular operation of the brushes 50, 52, as hereinafter more fully set forth. It will be noted that the brushes 50, 52, rotate in a vertical plane about the respective horizontal shafts 110, 112, and also circularly rotate in a horizontal plane about the power shaft 108. See FIGS. 3 and 6. The peripheral edges of the brushes 50, 52, contact the top surface of the longitudinal guide 28 and similarly will sweep the top surface of elongate thermoplastic strips (not shown) when they are urged forwardly through the machine upon the longitudinal guide 28. The sweeping action of the brushes 50, 52, in both the vertical plane and the horizontal plane in co-operation with the transverse brushes 46, 48, insures complete sweeping action of tablets across the surface of the thermoplastic strip during the medicinal tablet-filling operations.

Referring now to FIG. 6, the operation of the brushes 50, 52, will be described in detail. The electrical motor 106 mounts upon the crosshead 70 in secure manner, such as by conventional machine bolts 114, so that the motor 106 and its affixed power shaft 108 and circular brushes 50, 52, reciprocate with the reciprocation of the carriage portion 14 for tablet sweeping purposes. A bearing member 116 positions through the crosshead 70 and stationarily carries the vertical sleeve 118. A shaft extension 120 rotates within the sleeve 118 and journals within the sleeve affixed upper and lower bearings 122, 124. The shaft extension 120 terminates upwardly in a connecting socket 126 which affixes to the power shaft 108 in conventional manner, such as by the set screw 128. Thus, the power shaft 108 and the shaft extension 120 freely rotate upon energization of the electrical motor 106 and the bearing member 116 and its affixed vertical sleeve 118 remain stationarily affixed to the crosshead 70 during all periods of operation.

A gear box 130 encloses an upper bevel gear 132 which stationarily affixes to the lower terminus of the vertical sleeve 118 and a power bevel gear 134 which is affixed to the lower terminus of the shaft extension 120 and is rotated simultaneously with the shaft extension. A pair of right and left brush operating bevel gears 136, 138, mesh respectively with the bevel gears 132, 134, for brush operation as hereinafter more fully set forth. The gear box 130 downwardly houses a thrust bearing 140 in conventional manner to accommodate axial thrust forces which may be generated along the power shaft 108 and shaft extension 120. The upper portion of the gear box 130 encloses a ball bearing 142 of conventional design which has its inner race 144 affixed to the vertical sleeve 118. The ball bearing 142 and thrust bearing 140 co-operate to allow the gear box 130 to be freely rotatable about the bottom portion of the vertical sleeve 118. Thus, rotation of the power shaft 108 and shaft extension 120 by the electrical motor 106 serve to rotate the shaft extension affixed power bevel gear 134. Rotation of the power bevel gear 134 is transmitted to the brush bevel gears 136, 138, which mesh with the power bevel gear 134. Rotation of the brush operating bevel gears 136, 138, imposes rotative forces upon the stationary, sleeve-affixed, upper bevel gear 132. Inasmuch as the upper bevel gear 132 cannot rotate about the sleeve 118, rotative forces imposed by rotation of the power bevel gear 134 are then transmitted directly to the gear box 130 to cause the gear box to rotate about the ball bearing 142 and the thrust bearing 140, upon operation of the motor 106. Thus, power supplied by the motor 106 serves to rotate the gear box 130 in a horizontal plane and also, thereby, circularly rotates the brushes 50, 52.

Each brush 50, 52, affixes to its associated horizontal shaft 110, 112, by means of a sleeve 148 and set screw 146 in conventional manner to assure positive rotation of the brushes 50, 52, upon rotation of the horizontal shafts 110, 112. The horizontal shafts 110, 112, journal through the gear box 130 sidewalls in conventional manner and turn about ball bearings 148, 150, which are secured in the gear box construction. Each horizontal shaft 110, 112, inwardly affixes to its associated brush operating bevel gear 136, 138, in conventional manner to rotate when its associated bevel gear is rotated. Thus, rotative forces imposed upon the power bevel gear 134 by the motor 106 respectively rotates the horizontal shafts 110, 112, through the meshed brush operating bevel gears 136, 138. Rotation of the horizontal shafts 110, 112, causes similar rotary action of the brushes 50, 52, for medicinal tablet-sweeping purposes. The brush operating bevel gears 136, 138, mesh with the stationary upper bevel gear 132 to cause simultaneous circular action about the vertical power shaft 108 and shaft extension 120, and rotary action about the respective horizontal shafts 110, 112.

In order to use my invention, elongate strips of thermoplastic material (not shown), with longitudinal rows of depending blisters pre-formed therein (also not shown), are introduced into the intake end 152 of the longitudinal guide 28 with the respective rows of depending blisters extending into the longitudinal troughs 34, 36, so that the top of the thermoplastic strips closely overlie the top of the longitudinal strips 32. A plurality of medicinal tablets (not shown), are fed into the hopper 16 wherein they fall by gravity through the hopper opening 54 upon the transverse feed chute 18. Energization of the upper vibrator 20 vibrates the vibrator-arm 60 and the affixed feed chute 18, causing the medicinal tablets to travel transversely across the feed chute 18 under the additional influence of the forces of gravity imposed by the gravity feed from the hopper 16 until the medicinal tablets fall from the terminus 56 of the feed chute 18 upon the top surface of the thermoplastic strips (not shown). The lower vibrator 12 serves to vibrate the longitudinal guide 28 and the affixed longitudinal strips 32 through the lower vibrator arm 30. Vibration of the longitudinal guide 28 serves to disperse the medicinal tablets about the surface of the thermoplastic strip by gravity action. Means are provided (not shown), to pull the strips having the depending blisters forwardly through the apparatus 10 for blister filling purposes in well known manner. Thus, the tablets introduced at the feed chute 18 move forwardly through the apparatus upon the thermoplastic strips and into registry below the carriage portion 14. As hereinbefore set forth, the carriage portion 14 has reciprocal motion with respect to the longitudinal guide 28 by means of the cylinder 76 and so sweeps over the surface of the thermoplastic strip at a rate greater than the rate in which the strip travels through the apparatus 10.

The transverse brushes 46, 48, contact the top surface of the thermoplastic strips and tend to sweep all medicinal tablets remaining upon the surface of the strip rearwardly for blister filling purposes. Similarly, the circular brushes 50, 52, sweep across the top of the thermoplastic strip and the circular motion imposed by the operation of the motor 106 assures that all portions of the thermoplastic strip are equally treated for pill-filling purposes. Thus, any medicinal tablets remaining upon the surface of the thermoplastic strip will be swept rearwardly by the combined operation of the horizontal transverse brushes 46, 48, and the motion of the circular brushes 50, 52. Any medicinal tablet that is swept into registry with a depending blister will fall into that blister and out of contact with the brushes so it can no longer be rearwardly swept by the action of the brushes 46, 48, 50, 52. Should a second medicinal tablet register over a first tablet which has already been positioned within a depending blister, the second tablet will remain exposed at the surface of the thermoplastic strip and so will be contacted by the brushes to be swept out of registry with the filled blister. The operation is conducted at pre-determined sufficient speed to insure that the tablets are swept completely across the surface of the thermoplastic strip, so that all blisters are positively filled before they leave the upper and lower assembly areas. Tablets will remain upon the surface of a thermoplastic strip as it is pulled through the apparatus until such time as each tablet is individually swept into an empty depending blister. After the completely filled thermoplastic strip exits the filling apparatus 10, the individual tablets may be sealed in known manner within their associate blisters by other apparatus not forming part of the filling apparatus.

The combination of the rotary action of the transverse brushes 46, 48, rotating in a vertical plane, the circular action of the circular brushes 50, 52, which circularly rotate in a horizontal plane, the reciprocating movement of the carriage 14 with respect to the longitudinal guide 28 and the vibrating action of the longitudinal guide all co-operate to assure positive filling of each depending blister before it exits the apparatus.

What I claim is:

1. in an apparatus for inserting tablets into blisters which are formed in thermoplastic strips, the combination of
  A. a lower assembly supported in stationary position and including generally horizontal, longitudinally disposed guide means;
  B. an upper assembly having a portion thereof in vertical registry over the guide means,
    1. said upper assembly including tablet feed means and carriage means,
    2. said tablet feed means introducing tablets onto the guide means at the top surface thereof,
    3. said carriage means carrying a plurality of brushes in rotating arrangement,
      a said brushes sweeping the top of the guide means to contact the tablets and to move the tablets relative to the guide means; and
  C. reciprocating means provided in the carriage means to longitudinally reciprocate the plurality of brushes relative to the guide means.

2. The invention of claim 1 wherein the reciprocating means includes a pair of spaced side carriers which are longitudinally disposed relative to the guide means and wherein at least one of said plurality of brushes in rotatively journalled within the side carriers, said side carriers holding the one said brush in transverse position relative to the guide means.

3. The invention of claim 2 wherein the reciprocating means further include a drive motor and a vertical power shaft which is rotated by the drive motor, said power shaft circularly rotating at least one horizontal shaft, and wherein a second of said plurality of brushes is carried upon the horizontal shaft, the said power shaft circularly revolving the second brush over the guide means.

4. The invention of claim 3 wherein the power shaft and horizontal shaft are interconnected by gear means, the said gear means serving to rotate the horizontal shaft and the affixed second brush in a vertical plane, simultaneously as the horizontal shaft and second brush are circularly revolved.

5. The invention of claim 4 wherein the reciprocating means include a vertical sleeve which is affixed to the carriage means and wherein the power shaft rotates within the sleeve, the reciprocating means further including a stationary gear which is affixed to the sleeve.

6. The invention of claim 5 wherein the power shaft is provided at its lower terminus with a drive gear, the drive gear being spaced from the stationary gear and wherein the horizontal shaft carries a driven gear, the said driven gear intercommunicating between the stationary gear and the power gear, the said power gear rotating the driven gear in a vertical plane and circularly revolving the horizontal shaft and the affixed second brush above the guide means.

\* \* \* \* \*